J. SALUCKA.
VALVE FLOAT.
APPLICATION FILED MAR. 9, 1918.

1,288,688.

Patented Dec. 24, 1918.

INVENTOR
Justins Salucka

BY
ATTORNEY

UNITED STATES PATENT OFFICE.

JUSTINS SALUCKA, OF JAMAICA, NEW YORK.

VALVE-FLOAT.

1,288,688.

Specification of Letters Patent. Patented Dec. 24, 1918.

Application filed March 9, 1918. Serial No. 221,359.

*To all whom it may concern:*

Be it known that I, JUSTINS SALUCKA, a citizen of Russia, resident of Jamaica, county of Queens, and State of New York, have invented certain new and useful Improvements in Valve-Floats, of which the following is a specification.

This invention relates to improvements in automatically operated valves and particularly to the floats used in connection therewith, whereby the valve is closed upon the rising of a liquid to a predetermined point.

The principal object of the invention is to provide a valve float, composed of a non-corrodible material so that it will not be affected by the liquid, as are metallic floats, which rapidly deteriorate and therefore fail in performing their function.

A further object is to provide a float which is adjustable with relation to the length of the lever rod and which may be readily removed therefrom at any desired time.

These and other like objects are attained by the novel construction and combination of parts hereinafter described and shown in the accompanying drawing, forming a material part of this disclosure, and in which:—

Figure 1:
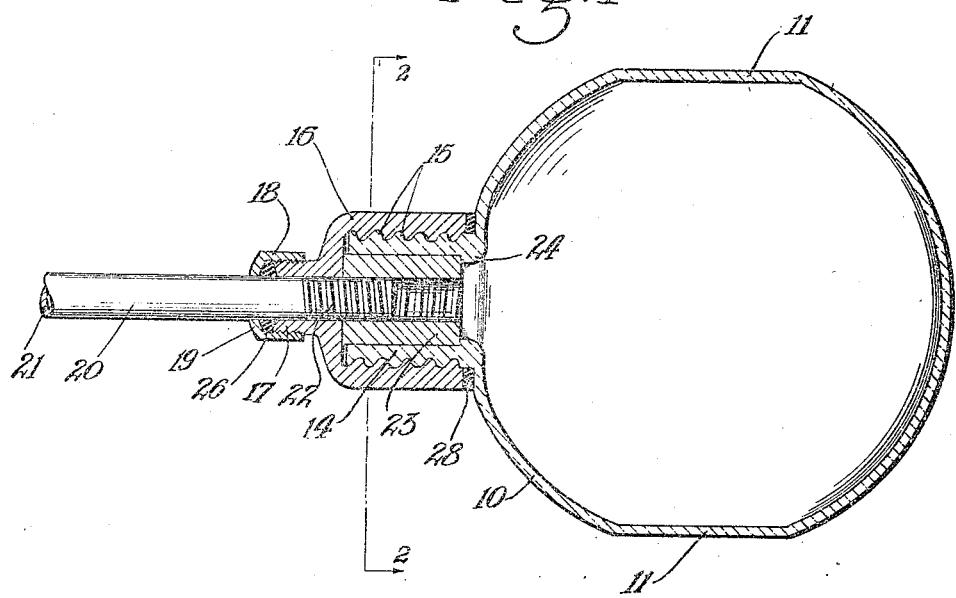
Figure 2:
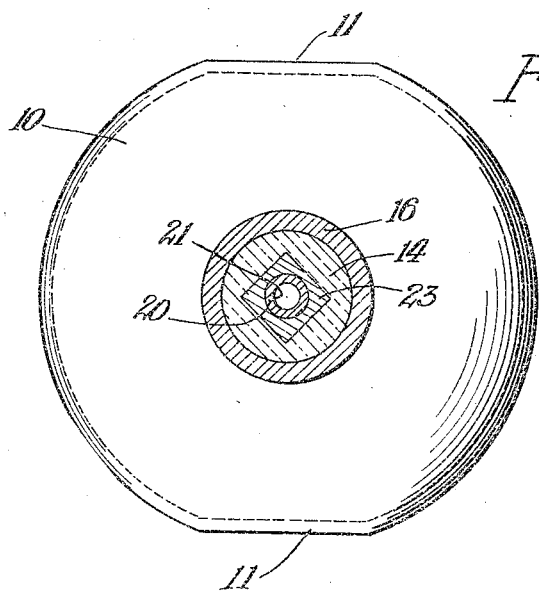

Figure 1 is a longitudinal sectional view taken substantially through the center of a valve float made in accordance with the invention, and Fig. 2 is a transverse sectional view taken on line 2—2 of Fig. 1.

Referring to the drawing, the numeral 10, represents a spherical hollow float, preferably made of glass and having two opposite flat sides 11, as indicated.

Extending axially outward from the globular float 10, is a tubular projection 14, provided upon its exterior with relatively coarse screw-threads 15, adapted to engage within a socket 16, interiorly threaded to suit the threads of the projection, the socket having a reduced neck or stem 17, screw-threaded upon its exterior, to which is fitted a cap 18, having a curved cover portion 19, through which passes the rod 20, having a through passage-way 21, and terminating in a screw-threaded end 22 which passes through the socket 16, and engages with an elongated square nut or internally threaded block 23 square in cross-section, the same being suited to be received within a corresponding square opening formed in the projection 14, the block being held therein by engagement with the raised annular flange 24 formed with the spherical float 10, at one end and with the bottom of the socket 16 at the other.

The extending neck 17 is formed concavely at its end so as to receive between it and the inner surface of the cover 19, a ring packing material 26, so as to form a tight joint with the supporting tubular rod 20. A similar ring 28, preferably of rubber, encircles the extension 14, closely adjacent to the walls of the sphere, the same being adapted to prevent breakage when screwing the sphere into place, and at the time prevents the liquid in which the float may rest from entering the tubular support rod 20.

From the foregoing it will be seen that the spherical float 10, may be operated either horizontally or vertically and that the liquid in which it is partially immersed is prevented from entering the tubular support, while at the same time a tight but pliable joint is maintained which prevents injuring the fragile float.

Having thus described my invention what I claim as new and desire to secure by Letters Patent, is.

1. In a valve float, the combination with a hollow, spherical float made of non-corrodible material and having oppositely disposed flat faces, of a hollow extension formed with said float, said extension having screw-threads upon its exterior, a socket engaged with the mentioned threads, a tubular support passing through said socket, said tubular support having screw-threads at its extremity, and a block rectangular in cross-section held in said extension, into which said tubular support is adjustably engaged.

2. In a valve float, the combination with a hollow spherical float composed of glass, a tubular extension formed with said float, a socket engageable with said extension, a stem formed with said socket, a tubular support rod passing through said socket and stem, a cap on said stem, packing material held by said cap engageable with said tubular rod, a nut fitted in said extension, means for preventing said nut from rotating, and threads formed at the end of said tubular rod engageable with said nut, whereby said float may be adjusted longitudinally with relation to said tubular support rod.

3. In a valve float, the combination with a hollow glass float having flat sides, and a tubular support rod therefor, of an extension formed with said float, coarse screw-threads formed on the outer surface of said extension, a socket engageable therewith, said socket having a stem through which said rod passes, means for packing the joint between said stem and said rod, an elongated square nut suited to a corresponding recess formed in said extension, said tubular rod being engageable within said nut and an elastic washer between the adjacent end of said socket and the surface of said sphere.

In testimony whereof I have affixed my signature.

JUSTINS SALUCKA.

Copies of this patent may be obtained for five cents each, by addressing the "Commissioner of Patents, Washington, D. C."